United States Patent [19]
Erickson

[11] Patent Number: 5,983,957
[45] Date of Patent: Nov. 16, 1999

[54] CONTAINER AND METHOD FOR TRANSPORTING FINELY DIVIDED OR DRIED COAL

[75] Inventor: Stewart E. Erickson, Marietta, Pa.

[73] Assignee: SEEC, Inc., Mendota Heights, Minn.

[21] Appl. No.: 08/483,794

[22] Filed: Jun. 7, 1995

Related U.S. Application Data

[62] Division of application No. 08/190,989, Feb. 3, 1994, Pat. No. 5,553,639.

[51] Int. Cl.⁶ ..................................................... B65B 31/00
[52] U.S. Cl. ......................... 141/7; 141/2; 141/4; 141/5; 141/61; 141/114; 141/231; 141/232; 105/423; 220/1.6; 414/812
[58] Field of Search ................................. 141/2, 4, 5, 7, 141/8, 10, 59, 61, 65, 114, 231–233; 105/358, 359, 423; 383/902; 220/1.6, 1.5; 414/267, 339, 467, 469, 507, 527, 539, 679, 812, 813

[56] References Cited

U.S. PATENT DOCUMENTS

| | | |
|---|---|---|
| 2,712,797 | 7/1955 | Woehrle . |
| 2,931,523 | 4/1960 | Nelligan . |
| 3,396,762 | 8/1968 | Paton ........................................... 141/7 |
| 3,806,185 | 4/1974 | Brandjord . |
| 3,962,959 | 6/1976 | Williamson . |
| 4,013,018 | 3/1977 | Hansen et al. . |
| 4,113,146 | 9/1978 | Williamson . |
| 4,143,796 | 3/1979 | Williamson et al. . |
| 4,224,970 | 9/1980 | Williamson et al. . |
| 4,253,507 | 3/1981 | Williamson . |
| 4,340,379 | 7/1982 | Williamson . |
| 4,457,456 | 7/1984 | Derby et al. . |
| 4,461,402 | 7/1984 | Fell et al. . |
| 4,470,749 | 9/1984 | Koudstaal . |
| 4,479,243 | 10/1984 | Derby et al. . |
| 4,541,765 | 9/1985 | Moore . |
| 4,542,764 | 9/1985 | Brittingham et al. . |
| 4,557,400 | 12/1985 | Clarke . |
| 4,613,053 | 9/1986 | Kimura et al. . |
| 4,691,371 | 9/1987 | Derby . |

(List continued on next page.)

OTHER PUBLICATIONS

Cajun Bag & Supply Co. brochure with cover letter dated Jan. 1995.
Cajun Bag & Supply Co. sizing chart, believed to have been available more than 1 year before the filing date of the present application.
Helios Container Systems, Inc. brochure with cover letter, believed to have been available more than 1 year before the filing date of the present application.

*Primary Examiner*—Steven O. Douglas
*Assistant Examiner*—Timothy L. Maust
*Attorney, Agent, or Firm*—Fredrikson & Byron, PA

[57] ABSTRACT

A container and method for transporting finely divided coal in rail cars or other cargo hauling vehicles, the container having a generally flexible and substantially oxygen impermeable barrier defining an encapsulated cavity. A port, including a coupling adapted to substantially prevent exposing the finely divided coal to oxygen, is positioned in the container for passing a flowable material through the barrier. The container also including a cap for sealing the port, a one-way pressure activated valve positioned in the barrier preventing gases in the cavity, and a harness for supporting the barrier and defining the shape of the cavity. The method generally having the initial steps of removing most of the oxygen from the cavity of the container, and adjusting the shape of the cavity to conform to the type of rail car that is being used to haul the finely divided coal. The method having the additional steps of filling the container with finely divided coal at a centralized collection site; sealing the container to substantially prevent introducing oxygen into the coal; loading the filled container into a rail car; hauling the container to a location where finely divided coal is used; unloading the container at the coal burning facility; and emptying the finely divided coal from the container at a location where the coal is used.

11 Claims, 4 Drawing Sheets

U.S. PATENT DOCUMENTS

| | | |
|---|---|---|
| 4,759,473 | 7/1988 | Derby et al. . |
| 4,799,607 | 1/1989 | Podd . |
| 4,903,859 | 2/1990 | Derby et al. . |
| 4,909,156 | 3/1990 | Erickson . |
| 5,040,693 | 8/1991 | Podd, Sr. et al. . |
| 5,076,710 | 12/1991 | Derby . |
| 5,109,893 | 5/1992 | Derby . |
| 5,152,735 | 10/1992 | Podd, Jr. et al. . |
| 5,181,625 | 1/1993 | Podd, Sr. et al. . |
| 5,193,710 | 3/1993 | Podd, Sr. et al. . |
| 5,300,226 | 4/1994 | Erickson . |
| 5,402,732 | 4/1995 | Erickson et al. . |

CONTAINER AND METHOD FOR TRANSPORTING FINELY DIVIDED OR DRIED COAL

This is a divisional of application Ser. No. 08/190,989, filed Feb. 3, 1994, now U.S. Pat. No. 5,553,639, issued Sep. 10, 1996.

FIELD OF THE INVENTION

The invention generally relates to a container and method for transporting goods in rail cars or other transportation vehicles and has particular utility in transporting finely divided coal or the like.

BACKGROUND OF THE INVENTION

The 1991 Clean Air Act mandates significant reductions in sulfur dioxide emissions from the burning of coal over the next decade. To comply with the 1991 Clean Air Act, coal-burning power plants will need to either use coal with a low sulfur content or install pollution control devices known as scrubbers to reduce the sulfur dioxide content in the emissions from the burnt coal.

The combustion and emission characteristics of a specific coal are a function of its BTU, water, and sulfur contents. Coal will optionally have a high BTU content, low water content, and low sulfur content. More specifically, coal having a high BTU content of 12,000–14,000 BTU/lb. is desirable. Coal having a water content that is substantially less than 20% by weight is desirable because water decreases the BTU content. Also, coal having a water content in excess of 20% by weight is expensive to transport because it requires substantially more coal to achieve the necessary BTUs, and a significant percentage of the commodity that is being transported is merely water.

The combustion and pollution characteristics of coal varies according to the region from which it is mined. Coal from the eastern United States generally has a BTU content of 12,000–14,000 BTU/lb., but these reserves also have prohibitively high sulfur contents. Coal from the western United States generally has an unacceptably low BTU content of only 8,000–10,000 BTU/lb. and an unacceptably high water content of 20% to 36% by weight, but these reserves have an acceptably low sulfur content. Additionally, large lignite reserves are located in North Dakota. Although lignite has an acceptably low sulfur content that can meet the Clean Air Act regulations, these reserves have a low BTU content of only 6,000 to 7,000 BTU/lb.

Solutions to overcome the shortcomings of the different types of coal have developed. Eastern coal is processed by micronizing the coal into small particles. Micronization entails grinding the coal into a very fine powder, and mixing the finely ground coal with a finely ground component of limestone. High-sulfur coal can be micronized to readily meet the Clean Air Act emission standards. Micronized coal has superior energy properties compared to other types of coals. Also, burning micronized coal results in a coal-ash by-product that has a high market value as a cement feedstock.

Western coal is generally processed by drying the coal creating briquets or fine particles of dried coal. Drying reduces the water content in the coal to acceptable levels, thereby increasing the BTU content. Western coal that has been dried and pulverized has a heat value of about 12,000 BTU/lb. and a water weight that is as low as 2% by weight.

In addition to Eastern and Western coal, lignite may also be used as a fuel in power plants. Lignite is a particularly dry, dusty substance. Lignite may also be dried or pulverized which makes it even dustier.

Making finely divided coal by micronization or pulverization, however, requires an extremely large capital investment in equipment. Pulverizers, for example, represent up to 20% of the total capital cost of the modern power plant. Micronizing is even more expensive than pulverizing. Consequently, it is desirable to centralize the equipment to micronize and pulverize coal at large coal collection sites, and subsequently transport the refined coal to the individual end users.

The transportation of finely divided coal, dried coal and/or lignite, however, involves significant handling and safety problems. These substances are subject to blowing out of existing open-topped rail cars because of their small particle size. This phenomenon, known as "blowout," results in a significant loss of coal and unacceptable environmental damage to people and property near rail lines. Finely divided coal, dried coal and/or lignite are also subject to spontaneous combustion when exposed to oxygen. Micronized coal, in fact, is not only spontaneously combustible, but highly explosive when exposed to oxygen. Therefore, a significant need exists to provide effective solutions to prevent blowout and spontaneous combustion in the transportation of finely divided coal, dried coal and/or lignite.

Current transportation devices and methods do not provide effective solutions to prevent blowout or spontaneous combustion during the transportation of finely divided coal. One ineffective method currently in use is water suppression. Water suppression entails simply spraying the top surface of coal-laden rail cars with water, but this method is unsatisfactory because the coal is still subject to blowout after the water evaporates within a few hours after it has been applied. Water suppression also exacerbates freezing problems that impact the efficiency of rail transportation. Another ineffective method is to place a tarp over a loaded coal car to prevent blowout. This method, however, is too expensive because it involves extensive labor. Moreover, these methods do not prevent spontaneous combustion because the coal is still exposed to oxygen.

Yet another ineffective suppression method is to spray the load of coal with polymers that act as a binding agent and form a film over the coal. Although this method prevents blowout, polymers are prohibitively expensive and create additional emission concerns when the coal is burned. Moreover, the coal may still be subject to spontaneous combustion or explosion because the polymers may not create an impermeable barrier to oxygen.

Finely divided coal, and other combustible commodities, have been transported in pneumatic tanker cars to maintain reduced oxygen levels to prevent blowout and spontaneous combustion. Hauling finely divided coal in pneumatic tanker cars, however, is not an efficient solution to the transportation problems of blowout and spontaneous combustion. First, pneumatic tanker cars are very expensive to build. Second, costly delays occur because finely divided coal cannot be rapidly loaded and unloaded using pneumatic tanker cars. Third, the cars cannot be used for back hauling anything, so they do not generate revenue for a railroad on both legs of a round trip. Fourth, the cars must be completely filled with an anaerobic gas before filling the cars with combustible materials. Lastly, pneumatic tanker cars do not provide a device for storing the highly combustible finely divided coal at the collection sites and user facilities. Therefore, the need exists to be able to adapt the existing fleet of coal cars to haul finely divided coal such as micronized or pulverized coal.

Several problems arise in adapting existing coal cars to haul finely divided coal. The most significant problem is that the existing containers which could encapsulate finely divided coal concentrate significant forces against the side walls of the rail cars as they move from side to side during transportation. Existing containers lack stability in current rail cars because they generally rest only upon the centersill extending longitudinally along the length of the car. Consequently, the centrifugal forces created during transportation cause existing containers to pivot over the top of the centersill and push against the outer side wall of the rail car relative to the centrifugal force. These forces against the side walls significantly stress the side walls and the cross members of the railcars reducing the useful life of the rail cars.

Another significant problem affecting the useful life of the rails cars is that the existing containers which could encapsulate finely divided coal also concentrate significant longitudinal forces against the internal cross braces. As a rail car accelerates or stops, the rail car will move at a different rate relative to the containers in the car. As a result, a longitudinal force will be created that acts upon the internal cross braces of the car. The internal cross braces, however, are not designed for such forces because bulk coal is generally flowable and does not concentrate forces on any specific structure in the rail car.

Typical collapsible container designs, such as Fabribin manufactured by American Fuel Cell and Coated Fabric Company, are not readily adaptable for use in coal rail cars because they merely rest on top of the internal centersill. An invention by the present inventor entitled "Rail Car Conversion Apparatus" relates to a device and method for handling Fabribin containers in transferring the forces away from the internal braces. In the rail car conversion apparatus invention, a large harness is adapted to fit on top of the side walls of a rail car, and a plurality of containers attached directly to this harness from individual attachment points. The rail car conversion apparatus invention, however, represents an inefficient and costly means to transfer forces away from the internal braces.

U.S. Pat. No. 4,909,156 issued to the present inventor, discloses a large, flexible bladder for use with open-top rail cars. This bladder includes a filling port positioned at the top of the car, and a discharge port positioned adjacent to the flow-control valve system carried on the underside of the car. This bladder, however, cannot be inserted or extracted from the rail car when it is full of material. Consequently, the bladder of the '156 patent cannot be rapidly loaded and unloaded at the mines and utilities, thereby resulting in unacceptable delays. Moreover, these bladders also do not provide any infrastructure for adapting the bladders to conform to the internal cross-members of the cars.

Utilization of finely divided coal has significant economic and environmental benefits. Currently, however, finely divided coal cannot be transported safely and economically using the existing coal car fleet. Therefore, the need exists to have a custom container, and method using such a container, that is readily adaptable to the existing coal car fleet to prevent blowout and spontaneous combustion during the transportation of finely divided coal.

SUMMARY OF THE INVENTION

The present invention relates to a container and a method using the container for safely and efficiently hauling finely divided coal, dried coal and/or lignite in existing coal rail cars. A container adapted to existing coal cars for transporting finely divided coal is made from a generally flexible, substantially oxygen impermeable barrier that defines an encapsulated cavity. At least one port is positioned in the barrier for passing a flowable material such as finely divided coal through the barrier. Each port includes a coupling that will substantially prevent introducing oxygen into the cavity while receiving or disgorging finely divided coal. A cap is provided for sealing a port after the cavity has been filled with finely divided coal. A one-way pressure-activated valve is positioned in the barrier for venting gases within the cavity to keep the pressure within the cavity generally equal to the ambient pressure. The container includes an infrastructure for supporting the barrier and defining the shape of the cavity. The infrastructure may be adjusted so that the shape of the cavity will substantially conform to the configuration of the interiors of existing coal hauling rail cars to stabilize the load and prevent concentrating transverse forces on the side walls and internal cross-members.

A method of containerized transportation of finely divided coal involves removing substantially all of the oxygen from the generally flexible container. The oxygen may be removed by collapsing the container, vacuuming the oxygen out of the container, or exchanging the oxygen with a substantially anaerobic gas. The infrastructure of the container may be adjusted to conform the container to the specific rail cars being used, and then the container may be filled with finely divided coal at a centralized site. After the container is filled, it is sealed to substantially prevent exposing the finely divided coal to oxygen. The filled containers are then loaded into existing coal hauling rail cars, and hauled to the location where the finely divided coal is used. The filled containers may then be unloaded at the site where the coal is used. Subsequently, the finely divided coal may be emptied from the containers and burned at such sites.

An objective of the present invention is to provide a customized container for preventing blowout and spontaneous combustion while hauling finely divided coal in existing coal hauling rail cars. Another objective of the present invention is to provide a container for storing finely divided coal at the locations where the coal is micronized or pulverized, and at the locations where it is burned. Yet another objective of the invention is to provide a container for backhauling the flyash by-product from burning micronized coal which is used as a cement feed stock. Yet another objective of the invention is to provide a container for backhauling petroleum fuels, industrial chemicals or the like to mine sites.

These and other features of the invention will become more apparent upon reference to the following description of the preferred embodiment of the invention, and in particular, upon referring to the drawings.

DETAILED DESCRIPTION OF THE PREFERRED EMBODIMENT OF THE INVENTION

Figure 1:
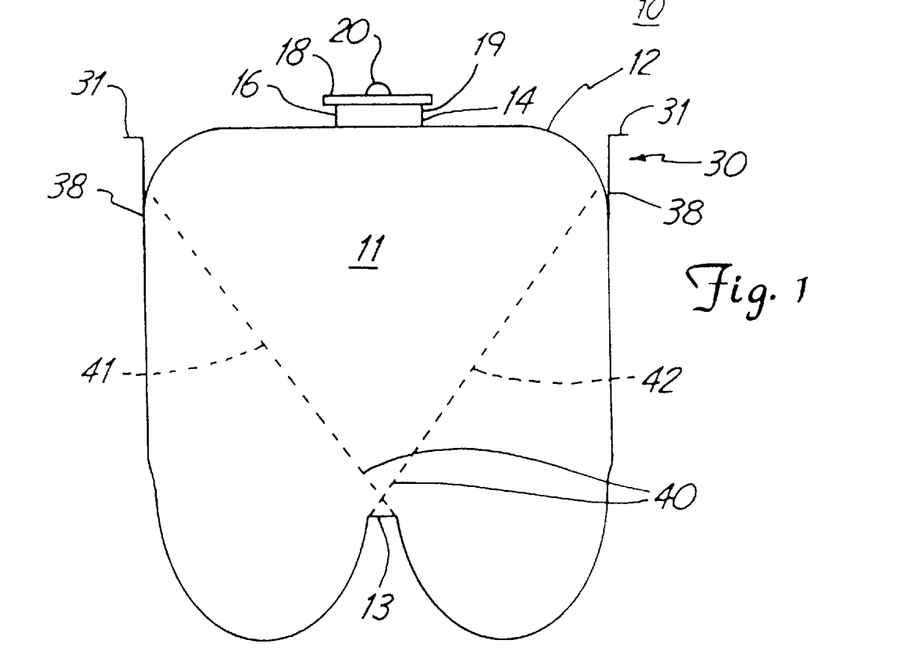
FIG. 1 is a front view of a container for transporting a flowable material in accordance with the invention.

FIG. 1 depicts the container 10 configured to define a cavity 11 having a double-bottom for transporting a flowable material. The container 10 is well suited for transporting a wide variety of flowable materials. Flyash, a by-product of burning coal that is useful as a cement feed stock, is one such flowable material. Other such flowable materials include industrial chemicals and fuels and the like. In one embodiment, described in detail below, the fuel is finely divided coal.

The container 10 may have a barrier 12 which is made from a generally flexible material that is substantially impermeable to oxygen and substantially puncture resistant. The barrier 12 may be made from rubber, an aromatic polyamide fiber such as Kevlar™, nitrylvinly nylon cloth, or other materials of the group that are relatively strong, wear resistant, and have a low permeability to oxygen. In one embodiment, the barrier may be a composite of such materials and may, for example, use Kevlar™ in those areas of the bladder which will be in direct contact with a railcar during transportation to provide improved strength, toughness and wear resistance in those areas where such characteristics are most needed. In a preferred embodiment, the barrier may be made from nitrylvinyl nylon cloth.

At least one port 14 is positioned in the barrier 12. A flowable material, such as finely divided coal, may be passed through the port 14. In a preferred embodiment, the port 14 may be positioned on the barrier 12 generally at the top of the container 10. The port 14 may have a coupling 16 sealingly connected to the barrier 12. The coupling 16 may be generally self-sealing and capable of substantially preventing oxygen from entering the cavity 11 while a flowable material is passed through the port 14. In a preferred embodiment, aviation fuel couplings such as dog-ear quick couplings or self-sealing couplings for dry powder handling may be used. One such self-sealing coupling is model number ______ manufactured by Dixon Valve & Coupling, Co. A cap 18 may be sealingly connected to the coupling 16 to ensure that the port 14 is substantially sealed. A lock 19 may be positioned between the port 14 and the cap 18 to prevent unauthorized entry into the containers. A hoisting means 20 may be connected to the cap 18. As will be discussed later, the hoisting means 20 is not the exclusive means to lift the container 10.

The barrier 12 may be supported and configured to create different cavity shapes by an adjustable infrastructure. The adjustable infrastructure may include an external harness 30 and internal supports 40. Referring now to FIGS. 1–4, the external harness 30 includes a number of hooks 31 that are preferably arranged in opposing pairs so that a first hook engages the left side wall 57 and a second hook engages the right side wall 58 in a position generally across from the first hook. Each hook 31 may have a pad 32 attached to the surface of the hook that engages the top of the rail car wall 58. A tether 36 may be connected to the hook 31 and the barrier 12. In a preferred embodiment, the hook 31 may be connected to one or more supports 38 that are attached to the side of the barrier 12. The external harness 30 supports the barrier 12 and reduces any movement of the container 10 within the rail car, thereby stabilizing the container.

Figures 3, 4, 5:
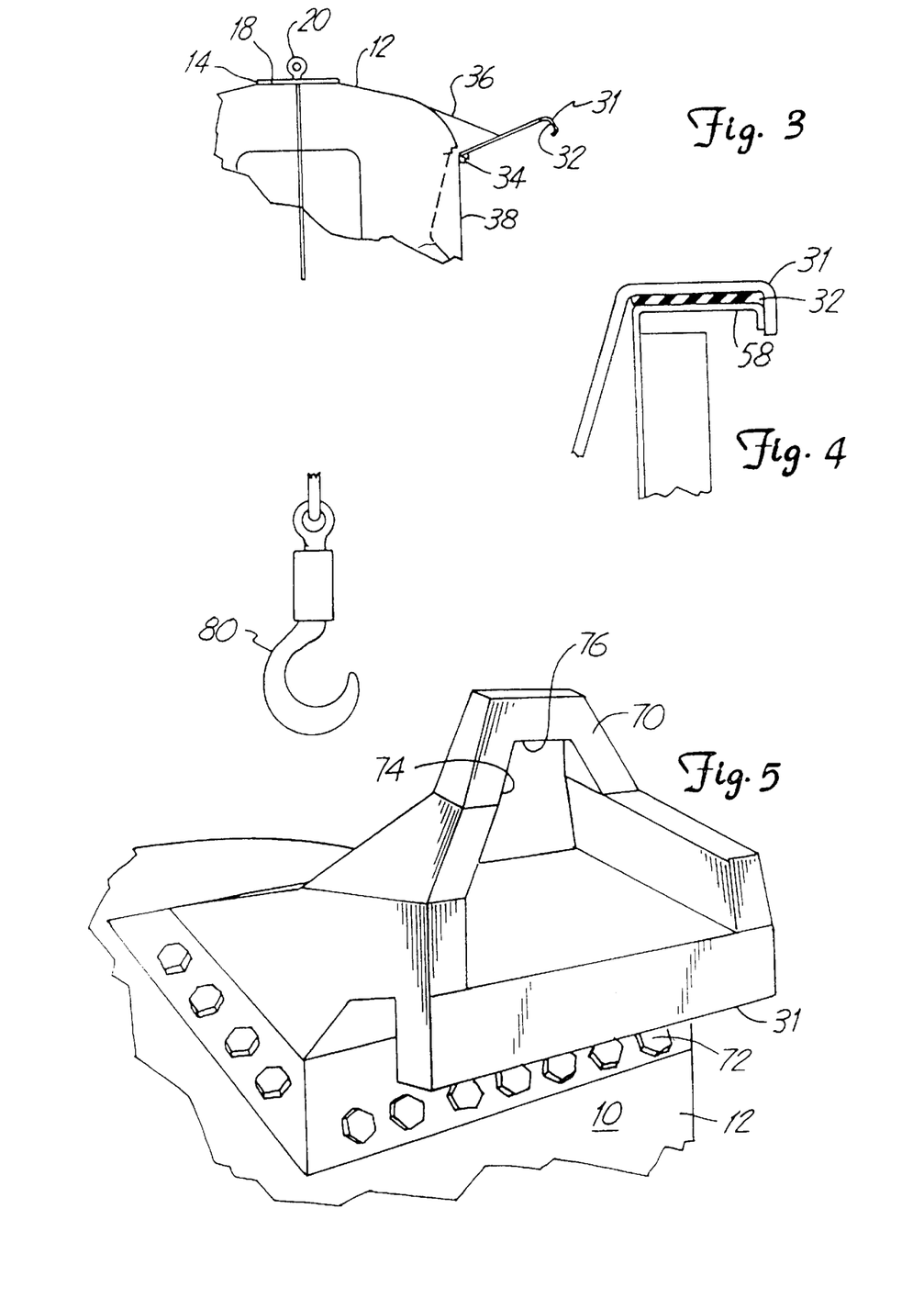
FIG. 3 is a detailed view of an external harness of a container in accordance with the invention.
FIG. 4 is a detailed view of a hook in accordance with the invention.
FIG. 5 is an elevational view of an embodiment of the container in accordance with the invention having a lifting catch.
Figure 6:
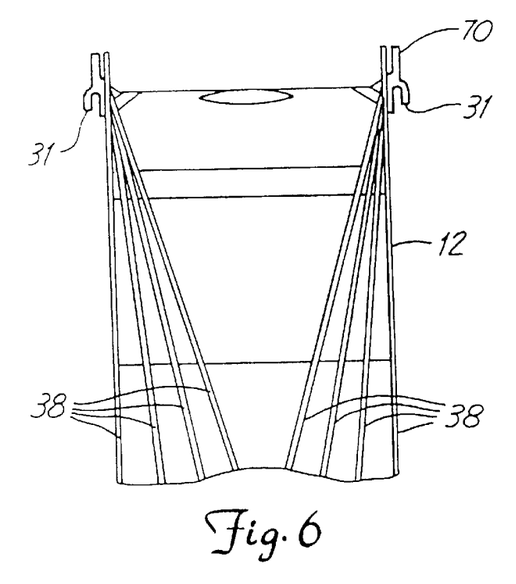
FIG. 6 is a front view of a container of the invention having a lifting catch.
Figure 7:
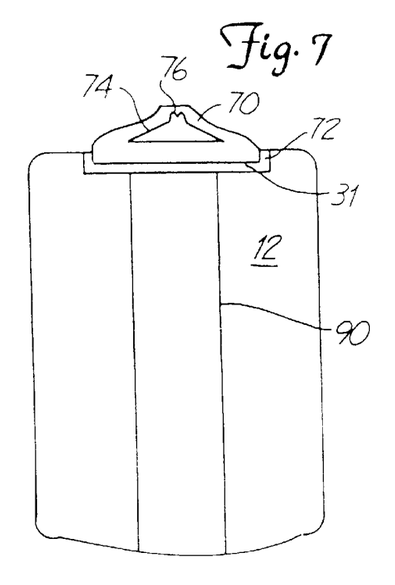
FIG. 7 is a side view of a container of the invention having a lifting catch.

FIGS. 5–7 depict an embodiment of the invention having a lifting catch 70 for easier and faster unloading of the container 10. The lifting catch 70 may have a substantially pyramidal shape and an inner surface 74 defining an opening through the pyramid. A hook 80 or some other lifting means on a hoist engages the lifting catch 70 anywhere on the inner surface 74. As the hook 80 is raised, it is automatically contained at the apex 76 of the lifting catch 70 making it easier and faster to unload a container 10.

It will be appreciated that the lifting catch 70 of the present invention may be integral with a hook 31 as shown in FIGS. 5–7, or it may be connected directly to the barrier 12 separately from the hook 31 (not shown). It will also be appreciated that the lifting catch 70 may have other shapes, such as semicircles, that are well-suited for the purposes of providing a larger target and automatically centering the hoisting means to the load.

Figure 9:
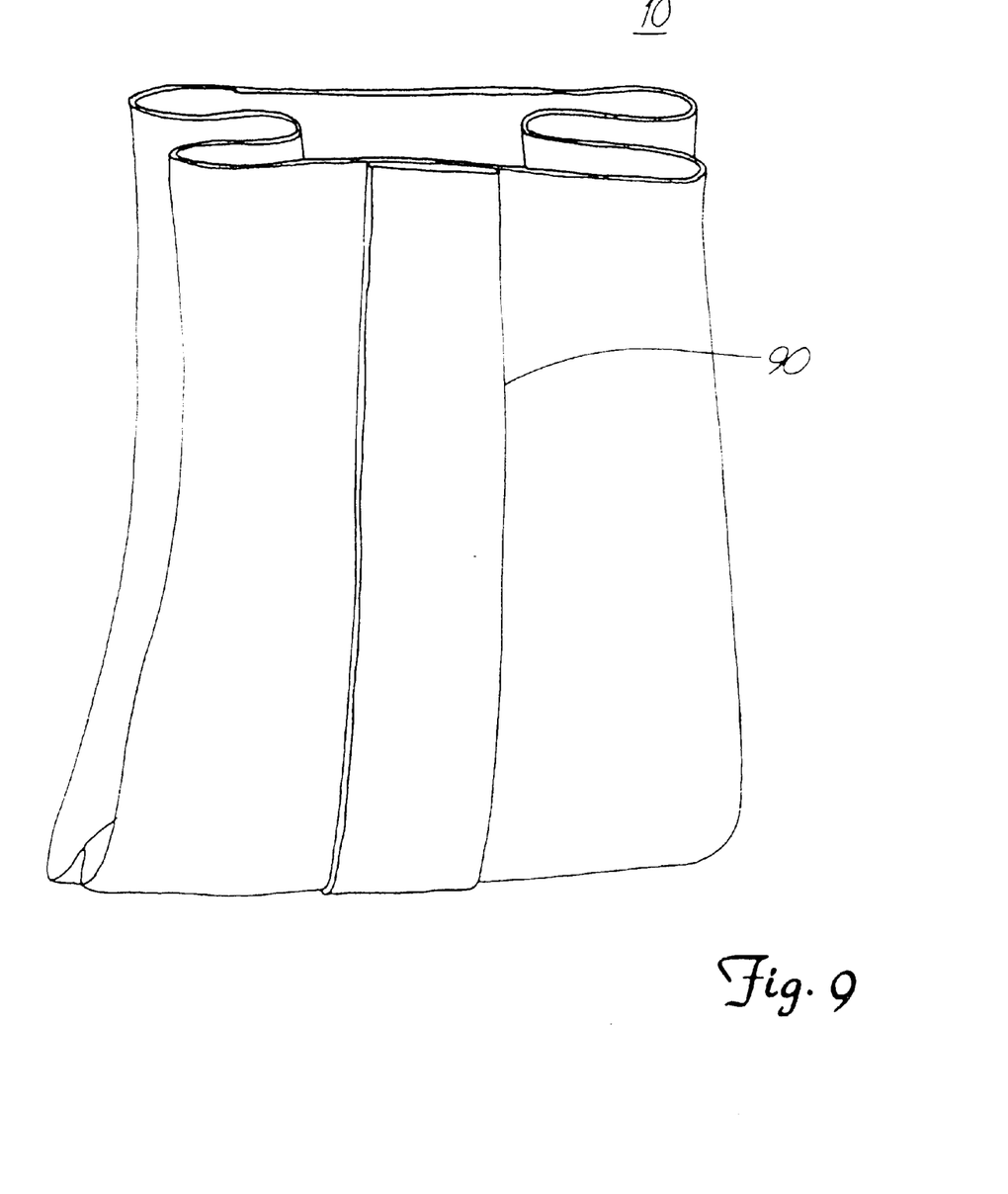
FIG. 9 is a perspective view of a container of the invention folded together.

FIG. 7 depicts an embodiment of the invention having a protective sash 90 externally attached to the barrier 12 for protecting the barrier from tears caused by bolts and other rough edges. The sash 90 is a puncture resistant material, and at least one sash is positioned on each surface of the barrier 12 facing the adjacent side walls of a rail car. The sash may be made from fairly rigid plastics, cordura, or the like. Generally, the sash may be about 20 to 24 inches wide and extend down the length of the side of the barrier 12. Other sizes and materials, however, may be used depending upon the specific transportation vehicles being used. The container 10 may be folded flat by moving the sashes on opposite sides of the container towards one another as shown in FIG. 9.

Figure 8:
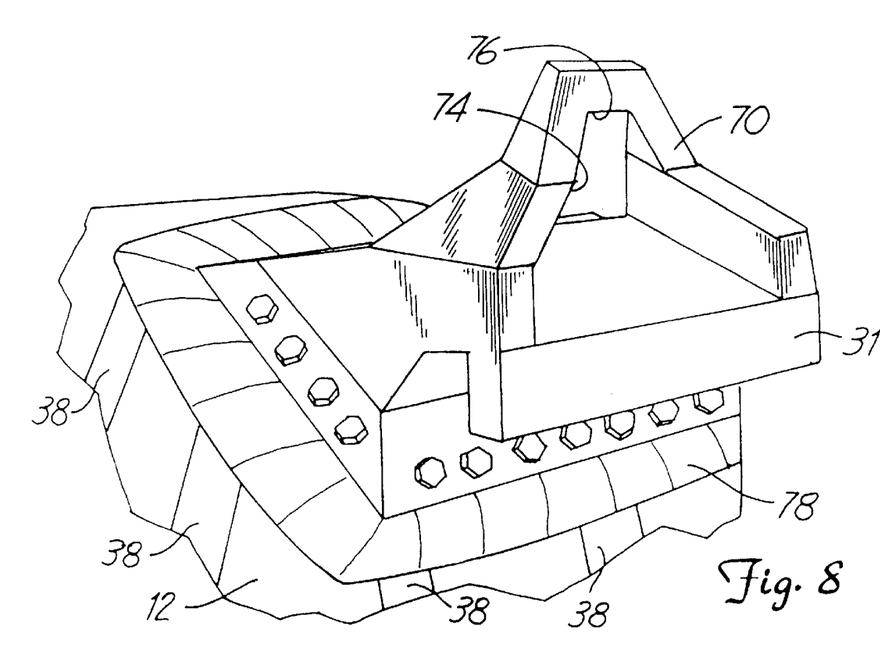
FIG. 8 is an elevational view of a container of the invention having a reinforced lifting catch.

FIG. 8 depicts a preferred embodiment of the invention in which the lifting catch 70 is integral with the hook 31, and the catch/hook assembly is connected to a reinforced section 78 of barrier 12. The supports 38 may be attached to the barrier 12 and the reinforced section 78 to provide support for the barrier 12 when it is filled with a flowable material.

Referring to FIG. 1, the container may be configured so that the cavity 11 conforms to the centersill of a rail car by adjusting the internal supports 40. In a preferred embodiment, the internal support 40 includes adjustable links 41 and 42. The links 41 and 42 may be generally adjustable lengthwise. Link 41 may be connected to the barrier 12 on its upper end below the point on the barrier in which a hook 31 or its corresponding siding 38 are connected. Link 42 may be connected to another hook 31 on the opposite side of the container at about the same location. The links 41 and 42 may then be connected to the lower side of the barrier 12 at their lower ends. In a preferred embodiment, the links 41 and 42 cross over each other and are connected to the internal surface of the barrier 12 along opposite sides of a wearguard 13. The links 41 and 42 may be straps, cables, ropes, chains, belts, or the like.

In alternative embodiment (not shown), the infrastructure including an external harness and internal support may be made from rigid members. The external harness may have hooks arranged in opposing pairs for engaging substantially the same relative positions of opposing side walls of an open-top rail car. Each hook may be attached to a siding member that extends down the side of the barrier. Each siding member may be hingedly connected to a plurality of rigid members that are hingedly and serially linked across the bottom of the container. The internal support may include a number of adjustable links. Each adjustable link may be connected to the barrier at its upper end, and to a point on the barrier adjacent to one of the hinges connecting the rigid members across the bottom of the barrier at its lower end.

Figure 2:
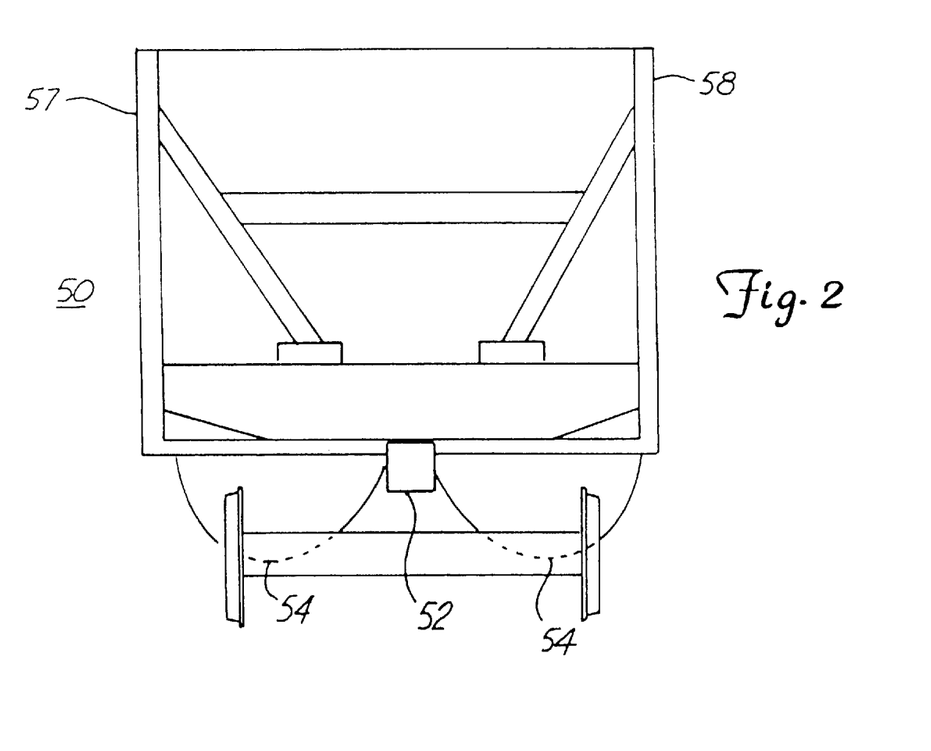
FIG. 2 is a front view of a double-bottom rail car currently used for hauling bulk coal.

FIGS. 1 and 2 depict a preferred embodiment in which the links 41 and 42 are adjusted to form a double-bottom. After a container 10 has been filled, it is hoisted into a rail car 50. The hooks 31 engage the sidewalls 57 and 58 in opposing pairs along the same respective positions of the side walls so that the container 10 conforms to the bottom 54 and the centersill 52 of the rail car. Container 10 substantially prevents concentrating forces on the centersill 52, and side walls 57 and 58, simulating the forces exhibited by bulk coal.

A method of the present invention using container 10 involves removing substantially all of the oxygen from the cavity. Oxygen may be removed from the cavity by either collapsing the container, drawing a vacuum in the cavity, or replacing the oxygen with a substantially anaerobic, non-reactive gas. One such anaerobic gas especially plentiful near mining operations is carbon dioxide. In a preferred method, the oxygen may be removed from the cavity of the container by other procedures such as completely collapsing the cavity 11 so that it has virtually zero volume.

Another step in a method is to adjust the internal supports 40 of the container 10 to conform to a shape of a rail car. In addition to the double-bottom shape previously discussed, a container may also be configured into a V-shape to conform to the bottom of a hopper car. It will be appreciated that the shape of the cavity is not limited to a double bottom or V-shape since the adjustable link can be adjusted to create any number of shapes.

After substantially all of the oxygen has been removed from the cavity, the container 10 is filled with a flowable material. In a preferred embodiment, the container 10 is filled with finely divided coal at a site where the coal is processed by micronization or pulverization. finely divided coal, which generally has a particle size equal to about one-half the diameter of a human hair, has a powder-like consistency. finely divided coal may be passed into the cavity of the container by fluidizing the coal with a substantially anaerobic gas. After the coal is fluidized, it can be passed into the container by pumping it in a manner similar to any other fluid. Alternatively, another embodiment of the invention mechanically actuates the coal into the container by auguring, vibrating, or "sound horn" devices well known in the art of handling dry powders.

In an alternative embodiment, the container is filled to a predetermined volume that is less than the total volume of the container. A completely full container is turgid and unable to flow around obstacles. As a result, completely full containers do not conform to the centersill of a rail car unless the internal supports are adjusted nearly perfectly. In this alternative embodiment, the predetermined volume is 50 to 90 percent of the total volume of the container, and preferably 70 to 80 percent. This alternative embodiment allows the container to adapt to the configuration of the centersill without having to readjust the internal supports for every rail car, and even allows containers without internal supports to conform to the floor of existing coal hauling rail cars.

After the container has been filled, either completely full or to a predetermined volume, the source of flowable material is disconnected and the coupling 16 may automatically seal the container to substantially prevent introducing oxygen to the flowable material. A cap 18 may be sealingly connected to the port 14 and coupling 16 to further ensure that the flowable material is not exposed to oxygen. In a preferred embodiment, a lock 19 is activated to prevent unauthorized access into the container.

The filled container is then loaded into a coal hauling rail car. A filled container may be hoisted into a rail car using a crane or the like. The hoist may act against a lifting catch 70 attached to either the hooks or the barrier, or a hoisting means on the cap, or a combination thereof. After the filled container is raised, it is positioned in the rail car as previously discussed to avoid overstressing the internal cross-members 52 of the rail car.

After the filled containers are loaded into the rail cars, they are hauled to a location using the flowable material. The containers may be either emptied as they sit on the rail cars, or hoisted out of the rail cars and emptied later. In a preferred embodiment, the containers are first hoisted out of the rail cars and then emptied. In doing so, the rail cars may move more quickly resulting in lower transportation cost. Also, the containers of the present invention inherently act as a storage means. Thus, the utilities do not need to make extensive investments in fixed storage facilities that are substantially oxygen free. The containers may be emptied in the same manner in which they were filled. It will be appreciated that a single container may be filled using one filling process, and emptied using yet another process.

Although the container and method of the present invention have been described as transporting finely divided coal, it will be appreciated that the term "finely divided coal" encompasses dried coal and/or lignite. It is also to be appreciated that the present invention is especially well suited for hauling other substances. Trains offer a superior mode of transporting chemicals, fuel or the like because they are more economical and safer than other modes of land transportation. Additionally, large quantities of chemicals and fuels must be transported to mines that are often situated in remote locations. The container and method of the present invention may be used to safely and economically haul substances such as chemicals and fuel to mines on the backhaul leg of a train route.

While the preferred embodiment of the invention has been described, it should be understood that various changes, adaptations and modifications may be made therein without departing from the spirit of the invention in the scope of the appended claims.

What is claimed is:

1. A method of transporting finely divided coal comprising the steps of:
   (a) providing a generally flexible container having an adjustable infrastructure;
   (b) removing substantially all of the oxygen from the container;
   (c) adjusting the infrastructure of the container to substantially conform the container to an internal shape of a rail car;
   (d) filling the container with finely divided coal at a centralized collection site while minimizing contact of the coal with oxygen;
   (e) sealing the container to substantially prevent exposing the coal to oxygen;
   (f) loading the filled container into a transportation vehicle;
   (g) hauling the filled container to a coal burning facility; and
   (h) emptying the finely divided coal from the container at the coal burning facility.

2. The method of claim 1, further comprising the step of unloading the filled container from a transportation vehicle before emptying the container at the coal burning facility.

3. The method of claim 1, wherein the step of removing the oxygen includes drawing a vacuum on the container.

4. The method of claim 1, wherein the step of removing the oxygen includes delivering a substantially anaerobic gas to the container.

5. The method of claim 1, wherein the step of removing the oxygen includes collapsing the container.

6. The method of claim 1, wherein the step of filling the container includes fluidizing the coal particles with a substantially anaerobic gas and creating a negative pressure differential between the pressure in the container and the pressure of the fluidized finely divided coal.

7. The method of claim 1, wherein the step of emptying the container includes fluidizing the coal particles within the container with a substantially anaerobic gas.

8. A method of transporting finely divided coal comprising the steps of:

(a) providing a generally flexible container;

(b) removing substantially all of the oxygen from the container;

(c) filling the container with a predetermined volume of finely divided coal, the container having a total volume and a fill volume, the fill volume being not more than ninety percent of the total volume, and the predetermined volume being not more than the fill volume;

(d) sealing the container to substantially prevent exposing the coal to oxygen;

(e) loading the filled container into a transportation vehicle;

(f) hauling the filled container to a coal burning facility; and (g) emptying the finely divided coal from the container at the coal burning facility.

9. The method of claim 8, wherein the flexible container includes an adjustable infrastructure, the method further comprising the step of adjusting the infrastructure of the container to substantially conform the container to an internal shape of a rail car.

10. The method of claim 8, wherein the step of filling the container includes fluidizing the coal particles with a substantially anaerobic gas and creating a negative pressure differential between the pressure in the container and the pressure of the fluidized finely divided coal.

11. The method of claim 8, wherein the flexible container includes an adjustable infrastructure, the method further comprising the step of adjusting the infrastructure of the container to substantially conform the container to an internal shape of a rail car.

* * * * *